United States Patent
Nabeto et al.

(10) Patent No.: US 9,780,696 B2
(45) Date of Patent: Oct. 3, 2017

(54) VIBRATION POWER GENERATOR AND POWER GENERATOR

(71) Applicant: OMRON Corporation, Kyoto-shi, Kyoto (JP)

(72) Inventors: Misato Nabeto, Nara (JP); Masayo Ikuta, Kyoto (JP); Tatsuakira Masaki, Nara (JP)

(73) Assignee: OMRON Corporation, Kyoto (JP)

( * ) Notice: Subject to any disclaimer, the term of this patent is extended or adjusted under 35 U.S.C. 154(b) by 535 days.

(21) Appl. No.: 14/391,546

(22) PCT Filed: Feb. 8, 2013

(86) PCT No.: PCT/JP2013/053156
§ 371 (c)(1),
(2) Date: Oct. 9, 2014

(87) PCT Pub. No.: WO2013/161344
PCT Pub. Date: Oct. 31, 2013

(65) Prior Publication Data
US 2015/0069880 A1    Mar. 12, 2015

(30) Foreign Application Priority Data
Apr. 26, 2012 (JP) .................................. 2012-101234

(51) Int. Cl.
H02N 1/08    (2006.01)
H02N 1/00    (2006.01)

(52) U.S. Cl.
CPC ............. *H02N 1/08* (2013.01); *H02N 1/006* (2013.01)

(58) Field of Classification Search
CPC .................................. H02N 1/08; H02N 1/006
(Continued)

(56) References Cited

U.S. PATENT DOCUMENTS

| 7,378,775 B2 * | 5/2008 | Potter | ...................... H02N 1/08 310/309 |
| 2008/0048521 A1 * | 2/2008 | Mabuchi | ............... B60C 23/041 310/309 |

(Continued)

FOREIGN PATENT DOCUMENTS

| JP | WO2009/054251 A1 | 4/2009 | |
| JP | WO 2011021488 A1 * | 2/2011 | ............... H02N 1/08 |

(Continued)

OTHER PUBLICATIONS

International Search Report for corresponding International Application No. PCT/JP2013/053156, mailed May 14, 2013 (1 page).

(Continued)

*Primary Examiner* — Alex W Mok
(74) *Attorney, Agent, or Firm* — Osha Liang LLP

(57) ABSTRACT

A vibration power generator configured to generate power by displacement between an electret group having a plurality of electrets and an electrode group having a plurality of electrodes in a relative movement direction in response to an external vibration, includes a casing in which the electret group and the electrode group are disposed, a fixed member in which one of the electret group and the electrode group is disposed, the fixed member being fixed to a side of the casing, and a movable member in which the other of the electret group and the electrode group is disposed. The movable member is disposed in the casing such that the movable member is relatively movable in response to the external vibration while opposed to the fixed member.

20 Claims, 9 Drawing Sheets

(58) Field of Classification Search
USPC .................. 310/300, 309; 307/400; 322/2 A
See application file for complete search history.

(56) References Cited

U.S. PATENT DOCUMENTS

| | | | |
|---|---|---|---|
| 2008/0258565 A1* | 10/2008 | Murayama | H02N 1/08 |
| | | | 307/400 |
| 2010/0019616 A1* | 1/2010 | Naruse | H02N 1/006 |
| | | | 310/300 |
| 2011/0266915 A1 | 11/2011 | Matsubara et al. | |
| 2013/0134830 A1 | 5/2013 | Ikuta et al. | |

FOREIGN PATENT DOCUMENTS

| | | | |
|---|---|---|---|
| JP | 2011-135710 A | | 7/2011 |
| JP | 2011211801 A | * | 10/2011 |
| WO | 2011/086830 A1 | | 7/2011 |

OTHER PUBLICATIONS

Notification of Reasons for Refusal issued in corresponding Korean Application No. 10-2014-7028451, mailed on Mar. 17, 2016 (9 pages).

* cited by examiner

VIBRATION POWER GENERATOR AND POWER GENERATOR

BACKGROUND

Technical Field

The present invention relates to a vibration power generator and a power generator for generating power in response to an external vibration.

Related Art

Nowadays, daily-available environmental energy independent of fossil fuel attracts attention from the viewpoint of energy saving. Electric energy generated by sunlight or wind power is well known as the environmental energy, and daily-available vibration energy can also be cited as the environmental energy having the same energy density as the electric energy generated by the sunlight or wind power.

A vibration power generator that generates the power using the vibration energy has been developed, and an electret that can semi-permanently retain a charge is widely used in the vibration power generator (for example, see Patent Document 1). In the technology of the vibration power generator, a supporting steel ball is arranged between a movable member and a fixed member, which are used in the vibration power generation, and a gap between the movable member and the fixed member is retained. In a crosswise direction (a direction orthogonal to a movement direction), although the supporting steel ball is arranged while sandwiched between the movable member and the fixed member, there is a certain level of margin due to dimensional accuracy of the movable member or fixed member.

PATENT DOCUMENTS

Patent Document 1: Japanese Unexamined Patent Publication No. 2011-135710
Patent Document 2: International Patent Publication No. 2009/054251

SUMMARY

In the case that the power is generated while relatively moving the electret and an electrode being opposed to each other, when a relative angle deviation of an array of the electrodes to an array of the electrets, namely, an azimuth increases, a substantially overlapping area between the electret and the electrode is reduced to degrade power generation efficiency of an external vibration. Even if the electrets and the electrodes are properly arranged on the fixed member and the movable member, when a relative movement direction of the movable member deviates relative to the array of the electrodes provided on the fixed member, the resultant azimuth increases in the relative movement for the vibration power generation.

Therefore, in the conventional technology, in order not to generate the deviation of the relative movement direction relative to the array of the electrets, the supporting steel ball is arranged in a void between the movable member and the fixed member, or the supporting steel ball is arranged in a groove extending in one direction. However, in the conventional technology, it is difficult to sufficiently correct the azimuth between the array of the electrets and the array of the electrodes in the relative movement due to the dimensional accuracy of the movable member or fixed member defining the void or the dimensional accuracy defining a width of the groove. The production of the vibration power generator becomes troublesome because the void or the groove is formed.

One or more embodiments of the present invention provides a structure to maximally decrease the deviation (azimuth) between the array of the electrets and the array of the electrodes in the vibration power generator that generates the power by relatively moving the electrets and the electrodes while the electrets and the electrodes are opposed to each other.

According to one or more embodiments of the present invention, the vibration power generator that generates the power by relatively moving the electrets and the electrodes while the electrets and the electrodes are opposed to each other uses a first support and a second support. The first support vertically supports the movable member and the fixed member. The second support supports the movable member by utilizing a lateral inner wall surface of a casing unit extending along the relative movement direction between the movable member and the fixed member. The vibration power generator also has a structure to bias the movable member toward the lateral inner wall surface to maintain the support by the second support. The movable member concerning the relative movement is supported utilizing the inner wall surface of the casing unit of the device, which allows the azimuth between the array of the electrets and the array of the electrodes to be maximally decreased by a simple structure.

Particularly, according to one or more embodiments of the invention, a vibration power generator configured to generate power by displacement between an electret group including a plurality of electrets and an electrode group including a plurality of electrodes in a relative movement direction in response to an external vibration, the vibration power generator includes: a casing unit in which the electret group and the electrode group are accommodated; a fixed member in which one of the electret group and the electrode group is provided, the fixed member being fixed to a side of the casing unit; a movable member in which the other of the electret group and the electrode group is provided, the movable member being accommodated in the casing unit such that the movable member is relatively movable in response to the external vibration while opposed to the fixed member; a first support configured to relatively movably support the movable member with respect to a bottom surface of the casing unit so as to define a gap between the electret group and the electrode group; a second support configured to support the movable member such that the movable member is relatively movable with respect to a lateral inner wall surface of the casing unit, the lateral inner wall surface of the casing unit defining the relative movement direction together with the bottom surface of the casing unit; and a support retainer configured to bias the movable member toward the lateral inner wall surface of the casing unit to retain a state in which the movable member is supported by the second support during the relative movement.

In the vibration power generator of one or more embodiments of the invention, the vibration power generation is performed by the displacement between the electret group and the electrode group in the relative movement direction in response to the external vibration. One of the electret group and the electrode group is arranged on the fixed member and the other is arranged on the movable member. Both the fixed member and the movable member are accommodated in the casing unit, the fixed member is fixed to the casing unit, and the movable member is arranged so as to be relatively movable with respect to the fixed member, thereby providing the relative movement for the vibration power generation of the electret group and the electrode group.

A gap distance between the electret group and the electrode group (hereinafter sometimes simply referred to as the "gap distance") and the angle deviation between the array of the electrets and the array of the electrodes (hereinafter sometimes simply referred to as the "azimuth") in the relative movement between the fixed member and the movable member can be cited as a large factor that determines a power generation characteristic of the vibration power generator. In the vibration power generator of one or more embodiments of the invention, as to the gap distance, the movable member is supported by the first support with respect to the bottom surface of the casing unit, thereby defining the gap distance suitable for the vibration power generation. The bottom surface is one of wall surfaces within the casing unit, and dead weights of the fixed member and the movable member are mainly applied to the bottom surface when the fixed member and the movable member are accommodated in the casing unit. When the first support supports the movable member, at least part of the dead weight of the movable member is always applied to the bottom surface through the first support.

As to the azimuth, with respect to the lateral inner wall surface of the casing unit, the second support supports the movable member, and the support retainer biases the movable member toward the lateral inner wall surface, thereby retaining the support state of the second support. The lateral inner wall surface is an inner wall surface different from the bottom surface, and the lateral inner wall surface defines the relative movement direction of the movable member together with the bottom surface. As a result, the movement of the movable member relative to the fixed member is oriented toward the direction (relative movement direction) defined by the bottom surface and the lateral inner wall surface in the casing unit, and some sort of load (at least part of the dead weight of the movable member for the bottom surface and a biasing force for the lateral inner wall surface) is applied to each surface through the movable member. The movable member surely follows the bottom surface and the lateral inner wall surface, and is able to move relative to the fixed member with the bottom surface and the lateral inner wall surface as a guide, and therefore the gap distance is properly maintained and the increase in azimuth is constrained.

Because both the bottom surface and the lateral inner wall surface in the casing unit are a part of the inner wall surface of the casing unit, it is not necessary to provide a special structure in forming a guide mechanism concerning the relative movement of the movable member. Therefore, the structure of the vibration power generator can be simplified, and the vibration power generator is easily produced.

In the vibration power generator of one or more embodiments of the invention, a space formed in the casing unit to accommodate the electret group and electrode group is not necessarily a closed space as long as the fixed member and the movable member are arranged in the casing unit in order to generate the power by the relative movement and the casing unit provides the inner wall surface that acts as a guide mechanism concerning the relative movement to constrain the azimuth. For example, a casing unit that is formed such that ambient air flows in and out from the inside thereof may be used to accommodate the electret group and the electrode group to generate the power.

The vibration power generator may further include an tilting unit configured to tilt the casing unit such that the lateral inner wall surface in which the movable member is supported by the second support is arranged downward relative to a surface in which the vibration power generator is installed. The support retainer biases the movable member toward the lateral inner wall surface using a dead weight of the movable member by tilting the casing unit by way of the tilting unit.

The vibration power generator includes the tilting unit, and the casing unit is tilted such that the lateral inner wall surface is located downward, so that the dead weight of the movable member can be distributed to not only the first support side but also the second support side. As a result, using efficiently the dead weight of the movable member, the movable member surely follows the bottom surface and the lateral inner wall surface, and the movable member can move relative to the fixed member while the azimuth is constrained. There is no particular limitation to an angle of the casing unit tilted by the tilting unit as long as forces applied to the bottom surface and the lateral inner wall surface in the casing unit by the dead weight of the movable member falls within a range of the load suitable for the relative movement of the movable member.

Another mode can be adopted when the support retainer retains the contact state. For example, in the case that the vibration power generator further includes a plurality of elastic members provided between the movable member and the casing unit, the support retainer may bias the movable member toward the lateral inner wall surface by a net force of elastic forces generated by the plurality of elastic members, the net force being applied to the movable member. That is, the plurality of elastic members are used to retain the state in which the second support supports the movable member. In this case, according to one or more embodiments of the present invention, during the relative movement of the movable member, the biasing forces of the plurality of elastic members always press the movable member against the lateral inner wall surface.

In the case that the biasing force is applied to the movable member using the plurality of elastic members, according to one or more embodiments of the present invention, the plurality of elastic members are coupled to the movable member using one coupler located at one place. When the plurality of elastic members are coupled to the movable member using a plurality of couplers located at a plurality of places, a turning force (moment) to generate turning of the movable member is easily applied according to positions of the couplers or an elastic force of each elastic member. The turning of the movable member is relative movement different from the relative movement of the movable member for the power generation. When the turning force is applied to the movable member, the relative movement for the vibration power generation is disturbed to inevitably degrade the power generation efficiency. Therefore, the plurality of elastic members are coupled to the movable member with one coupler, so that the degradation of the power generation efficiency due to the turning of the movable member can be avoided.

Another mode can be adopted when the support retainer retains the contact state. For example, the support retainer may bias the movable member toward the lateral inner wall surface by a predetermined physical force, the physical force being applied between the movable member and the lateral inner wall surface so as to bring the movable member and the lateral inner wall surface close to each other. A magnetic force, an electrostatic attractive force, a physical pressure, and a centrifugal force can be cited as an example of the predetermined physical force. Various physical forces can be used as long as the relative movement of the movable member is not disturbed.

In the vibration power generator, based on a shape of the lateral inner wall surface defining the relative movement direction, an array of the plurality of electrets in the electret group and an array of the plurality of electrodes in the electrode group may be determined such that an overlapping area of the plurality of electrets included in the electret group and the plurality of electrodes included in the electrode group is maximized, the plurality of electrets and the plurality of electrodes being related to vibration power generation. The power generation efficiency of the vibration power generator becomes the maximum in the case that the overlapping area between the plurality of electrets and the plurality of electrodes is maximized and, according to one or more embodiments of the present invention, in the case that the array of the plurality of electrets and the array of the plurality of electrodes are aligned with each other to eliminate the azimuth. Therefore, the array of the plurality of electrets and the array of the plurality of electrodes are determined based on the shape of the lateral inner wall surface defining the relative movement direction, which allows the power generation efficiency to be maximally obtained. Particularly, in the vibration power generator of one or more embodiments of the invention, the movable member moves relatively while surely following the bottom surface and the lateral inner wall surface in the casing unit. Therefore, by determining the array of the electrets and the array of the electrodes in the above way, the power generation efficiency is expected to be further improved.

In the vibration power generator, the movable member may include a contact unit configured to contact with a movement-direction inner wall surface of the casing unit when the movable member is displaced along the relative movement direction, the movement-direction inner wall surface being located in the relative movement direction of the movable member, the movement-direction inner wall surface being located in a central region of a width of the movable member opposed to the movement-direction inner wall surface. The turning force of the movable member is generated when the movable member is displaced to a maximum amplitude to contact with the movement-direction inner wall surface as a result of the external vibration. When the contact unit is arranged in the central region of the width of the movable member, a distance between a turning center of the movable member and a point of application of the turning force, namely, a distance between the contact unit and the contact position of the movement-direction inner wall surface can be shortened, and therefore the turning force applied to the movable member is maximally decreased. As a result, the degradation of the power generation efficiency due to the turning force can be constrained.

In the vibration power generator, the first support may perform rolling support of the movable member using a first turning member, the first turning member being sandwiched between the bottom surface of the casing unit and the movable member, and the second support may perform rolling support of the movable member using a second turning member, the second turning member being sandwiched between the lateral inner wall surface and the movable member. The rolling support in the first support and the rolling support in the second support are performed by the independent turning members, whereby sliding is maximally constrained in the turning member. A steel ball and a columnar member can be used as the turning member.

In the rolling support in each support, differential sliding is hardly generated by the use of the steel ball, and a sliding friction can be removed in principle in the relative movement between the movable member and the fixed member. For example, the sliding friction can be expected to be removed by the following structure in which the second support supports the movable member.

(1) In the vibration power generator, in the case that the second turning member is a steel ball having a spherical shape, while the support retainer retains the support state, the steel ball may contact with the movable member at first and second contact points, the steel ball being supported in a direction opposite to a dropping direction of the steel ball at the first contact point, the second contact point being located on a side opposite to the first direction with respect to the steel ball, the steel ball may contact with the lateral inner wall surface at a third contact point, and a virtual triangle formed by connecting the first, second, and third contact points may be an isosceles triangle with the third point as a vertex.

(2) In the vibration power generator, in the case that the second turning member is a steel ball having a spherical shape, while the support retainer retains the support state, the steel ball may contact with the movable member at a first contact point, the steel ball being supported in a direction opposite to a dropping direction of the steel ball at the first contact point, the steel ball may contact with the lateral inner wall surface at a second contact point, and a virtual straight line connecting the first and second contact points may pass through a center of the steel ball.

A power generator according to one or more embodiments of the present invention can generate the power in response to the external force. In this case, according to one or more embodiments of the invention, a power generator configured to generate power by relative movement between an electret group including a plurality of electrets and an electrode group including a plurality of electrodes, the power generator includes: a casing unit in which the electret group and the electrode group are accommodated; a fixed member in which one of the electret group and the electrode group is provided, the fixed member being fixed to a side of the casing unit; a movable member in which the other of the electret group and the electrode group is provided, the movable member being accommodated in the casing unit such that the movable member is relatively movable in response to an external force while opposed to the fixed member; a first support configured to relatively movably support the movable member with respect to a bottom surface of the casing unit so as to define a void between the electret group and the electrode group; a second support configured to support the movable member such that the movable member is relatively movable with respect to a lateral inner wall surface of the casing unit, the lateral inner wall surface of the casing unit defining a direction of the relative movement together with the bottom surface of the casing unit; and a support retainer configured to bias the movable member toward the lateral inner wall surface of the casing unit to retain a state in which the movable member is supported by the second support during the relative movement. The technical thought concerning the vibration power generator of one or more embodiments of the invention can also be applied to the power generator. Accordingly, in the power generator, when the movable member moves relative to the fixed member to generate the power in response to the external force, the gap distance between the movable member and the fixed member is properly maintained and the increase in azimuth is constrained. In addition to the reciprocation in response to the external vibration, a mode in which the movable member moves in one direction with respect to the fixed member and a mode in which the movable member can move permanently with respect to the fixed member (for example, the fixed member is circularly formed and the movable member moves above a circular inner surface or a circular outer surface of the fixed member) can be cited as an example of the mode of the relative movement of the movable member in the power generator.

The invention also includes a vibration power generator assembling method. In this case, according to one or more embodiments of the invention, a method for assembling a vibration power generator configured to generate power by displacement between an electret group including a plurality of electrets and an electrode group including a plurality of electrodes in a relative movement direction in response to an external vibration, the vibration power generator assembling method includes the steps of: inserting from an outside of a casing unit into the casing unit a fixed member in which one of the electret group and the electrode group is provided, the casing unit in which the electret group and the electrode group are accommodated, the insertion performed while the electret group or the electrode group faces toward an inside of the casing unit; fixing the fixed member to the casing unit while the fixed member abuts on a projection portion on a side of the casing unit, the projection portion positioned at a predetermined level with respect to a bottom surface of the casing unit along the insertion direction; arranging a first support on the bottom surface of the casing unit, the first support supporting a movable member in which the other of the electret group and the electrode group is provided so as to define a gap between the electret group and the electrode group; arranging the movable member on the first support member such that the electret group or electrode group provided in the movable member faces toward the side of the fixed member; and arranging a second support between the lateral inner wall surface of the casing unit and the movable member, the second support supporting the movable member such that the movable member is relatively movable, the lateral inner wall surface of the casing unit defining the relative movement direction together with the bottom surface of the casing unit, and biasing the movable member toward the lateral inner wall surface of the casing unit while the movable member is supported by the second support.

The deviation (azimuth) between the array of the electrets and the array of the electrodes is maximally decreased in the vibration power generator that generates the power by relatively moving the electrets and the electrodes while the electrets and the electrodes are opposed to each other.

DETAILED DESCRIPTION

Hereinafter, embodiments of the invention will be described with reference to the drawings. The following embodiments are only examples, and the invention is not limited to the below embodiments. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
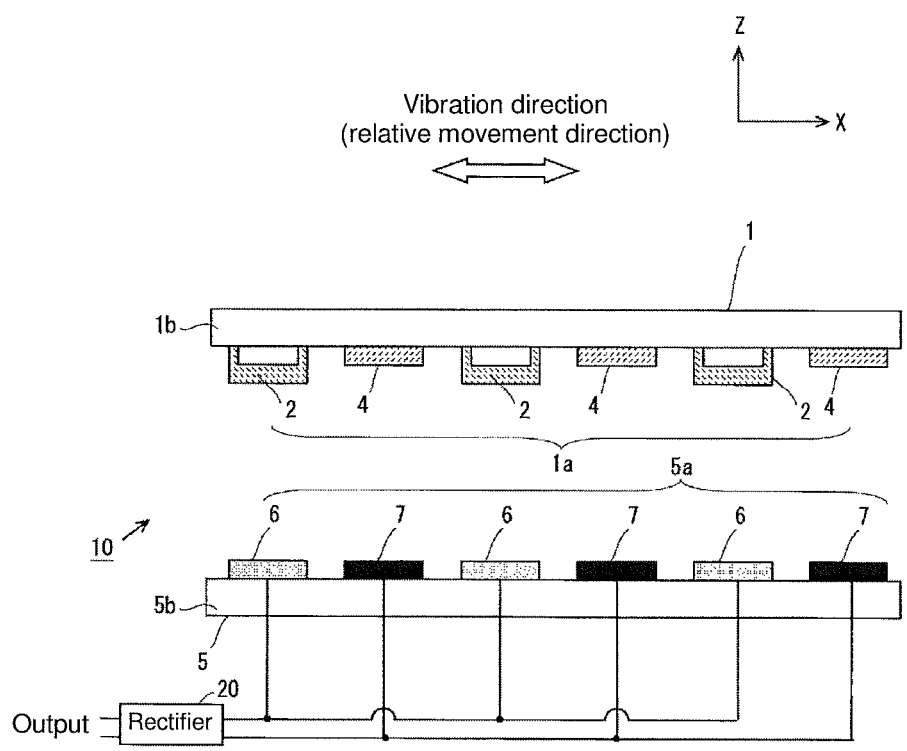
FIG. 1 is a view illustrating schematic configurations of an electret group and an electrode group of a vibration power generator according to one or more embodiments of the invention.

FIG. 1 illustrates a schematic configuration of a vibration power generator 10 according to one or more embodiments of the invention, particularly configurations of an electret group 1a and an electrode group 5a provided in a movable member 1 and a fixed member 5, respectively, which generate power in response to an external vibration. In FIG. 1, it is assumed that an X-direction is a direction in which electrets and electrodes are arrayed and a relative movement direction of the movable member 1 to the fixed member 5, that a Z-direction is a direction in which the movable member 1 and the fixed member are opposed to each other, and that a Y-direction is a direction orthogonal to the X-direction and the Z-direction. FIG. 1 is a sectional view when the vibration power generator 10 is cut in a ZX-plane.

Figure 2:
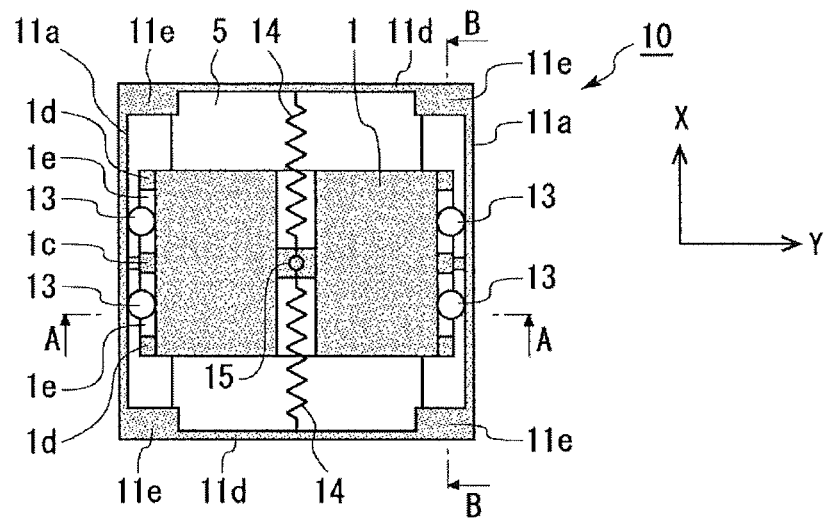
FIG. 2 is a plan view of a vibration power generator according to a first embodiment of the invention.

In the vibration power generator 10, the movable member 1 and the fixed member 5 are accommodated in a casing 11 in FIG. 2. The movable member 1 and the fixed member 5 are relatively movable while opposed to each other. A support structure enabling the relative movement of the movable member 1 is described later. The fixed member 5 is fixed to the casing 11. On the other hand, because both ends of the movable member 1 are connected to the casing 11 by springs 14 (see FIG. 2 and the like), the movable member 1 reciprocates (vibrates) relative to the fixed member 5 fixed to the casing 11 in response to the external vibration.

The movable member 1 and the fixed member 5 are movable relative to each other while opposed to each other in parallel with each other, namely, while a gap between surfaces opposed to each other is kept constant. Therefore, an electric signal can be generated in a pair of electrodes 6 and 7 on the side of the fixed member 5 by action of an electret 2 on the side of the movable member 1. Because a principle generating the electric signal is well known, the detailed description is neglected. A structure to retain the gap between the movable member 1 and the fixed member 5, namely, a structure to maintain the smooth relative movement between the movable member 1 and the fixed member 5 is described later.

A structure on the side of the movable member 1 will be described below. In the movable member 1, the electret group 1a is formed on a movable board 1b. In the movable member 1, the electret group 1a is provided on the side of the surface opposed to the fixed member 5, and the electret group 1a includes a plurality of electrets 2 that are formed on a conductor and a plurality of guard electrodes 4 that are not grounded. The electrets 2 and the guard electrodes 4 are alternately arranged along the relative movement direction (X-direction) of the movable member 1 to the fixed member 5. The plurality of electrets 2 and the plurality of guard electrodes 4 are formed into comb shapes. The electret 2 and the guard electrode 4 are nested inside each other. As described above, because FIG. 1 illustrates the ZX-section, the electrets 2 and the guard electrodes 4 are alternately arranged in FIG. 1. In the first embodiment, the electret 2 semipermanently retains a negative charge.

In the first embodiment, the guard electrode 4 is not grounded as described above. Alternatively, the guard electrode 4 may be grounded.

A structure on the side of the fixed member 5 will be described below. In the fixed member 5, the electrode group 5a is formed on a fixed board 5b. In the fixed member 5, the electrode group 5a is provided on the side of the surface opposed to the movable member 1, and the electrode group 5a includes a plurality of small electrode groups each of which includes a pair of electrodes (first electrode 6 and second electrode 7).

In the vibration power generator 10 having the above configuration, due to a relative position variation of the movable member 1 including the plurality of electrets 2 to the fixed member 5 in response to the external vibration, an electromotive force is generated between the electrodes 6 and 7 according to the relative position variation (vibration), thereby generating the power. The generated power is rectified by a rectifier 20, and becomes output of the vibration power generator 10.

First Embodiment

Figure 3A:
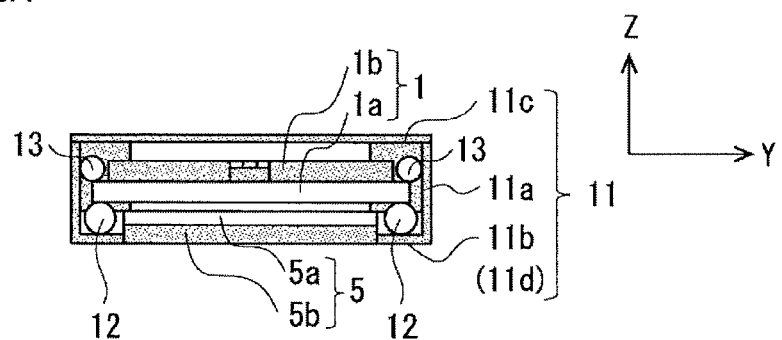
FIG. 3A is a first sectional view of the vibration power generator in FIG. 2.
Figure 3B:
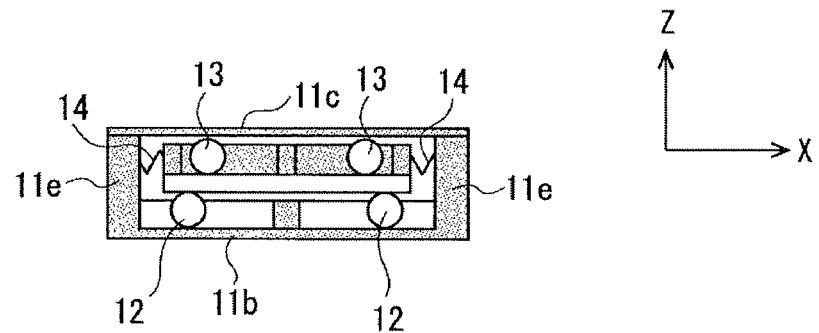
FIG. 3B is a second sectional view of the vibration power generator in FIG. 2.

FIGS. 2, 3A, and 3B illustrate a schematic configuration of the vibration power generator 10 of the first embodiment. FIG. 2 is a plan view (a plan view in the XY-plane) of the vibration power generator 10, FIG. 3A is a sectional view (a sectional view in the ZY-plane) taken on line A-A in FIG. 2, and FIG. 3B is a sectional view (a sectional view in the ZX-plane) taken on line B-B in FIG. 2. FIG. 2 illustrates the state in which a top surface 11c of the casing 11 is removed to visualize the inside of the casing 11. As can be seen from FIGS. 2, 3A, and 3B, the fixed member 5 including the electrode group 5a and the fixed board 5b and the movable member 1 including the electret group 1a and the movable board 1b are accommodated in the casing 11 of the vibration power generator 10. The casing 11 substantially has a rectangular parallelepiped shape, and includes the top surface 11c, a bottom surface 11b, a pair of side surfaces 11a extending in the X-direction that is of the relative movement direction of the movable member 1, and a pair of side surfaces 11d which is orthogonal to the relative movement direction and extends in the Y-direction.

As illustrated in FIG. 3A, the fixed member 5 is fixed to the bottom surface 11b of the casing 11 such that the electrode group 5a faces upward (the inner side of the casing 11). While the fixed member 5 is fixed to the casing 11, the movable member 1 is supported by the fixed member 5 with supporting steel balls 12 interposed therebetween so as to be movable relative to the fixed member 5. The support concerned corresponds to the support of the movable member 1 by the first support of one or more embodiments of the invention. Specifically, as illustrated in FIGS. 3A and 3B, a large enough number of supporting steel balls 12 to be able to support the movable member 1 are arranged between the side of the electret group 1a of the movable member 1 and the inner wall surface of the bottom surface 11b. That is, the movable member 1 is arranged on the plurality of supporting steel balls 12 arranged on the inner wall surface of the bottom surface 11b. Thus, the gap distance between the electret group 1a on the side of the movable member 1 and the electrode group 5a of the fixed member 5 is defined to a predetermined distance suitable for the power generation while the movable member 1 is supported by the supporting steel ball 12.

For the movable member 1, the support structure is used to decrease an azimuth between the array of the electrodes 6 and 7 provided on the side of the fixed member 5 and the array of the electrets 2 provided on the side of the movable member 1 in the movement relative to the fixed member 5. Specifically, supporting steel balls 13 are arranged between the movable member 1 and the inner wall surfaces of the side surfaces 11a. The supporting steel balls 13 are supported by a structure on the side of the movable member 1 so as not to drop, and the detailed structure is described later. In each side surface of the movable board 1b opposed to the inner wall surface of the side surface 11a, end-side projections 1d are provided at both ends of the side surface of the movable board 1b, and a central projection 1c is provided in a central portion of the side surface of the movable board 1b, whereby a supporting groove 1e in which the supporting steel ball 13 can be arranged is formed between each end-side projection 1d and the central projection 1c. Accordingly, as illustrated in FIG. 2, the two supporting grooves 1e are formed on the either side of the movable member 1, and the supporting steel ball 13 is arranged in each of the supporting grooves 1e. The movable member 1 can smoothly move along the relative movement direction with respect to the fixed member 5 by arranging the supporting steel balls 13 between the lateral side of the movable member 1 and the inner wall surface of the casing 11. The support concerned corresponds to the support of the movable member 1 by the second support of one or more embodiments of the invention.

Additionally, the spring 14 is arranged between the movable member 1 and each of the two side surfaces 11d of the casing 11 while a connection unit 15 provided in a substantially central portion in the XY-plane of the movable member 1 is interposed between the springs 14. In the state of FIG. 2, the spring 14 is connected to a substantially central portion of the side surface 11d, and the springs 14 are arranged such that an elastic force of each spring 14 is applied in the relative movement direction (X-direction). The movable member 1 subjected to the external vibration reciprocates in the casing 11 by the elastic force of the spring 14, and the power is efficiently generated.

In the vibration power generator 10 of the first embodiment, the support for the movable member 1 with respect to the bottom surface 11b by the supporting steel balls 12 is independent from the support for the movable member 1 with respect to the side surfaces 11a by the supporting steel balls 13. By supporting the movable member 1 in this manner, the relative movement direction is uniquely determined by a geometric condition. Therefore, the movable member 1 can stably move relative to the fixed member 5.

For the support with respect to the bottom surface 11b by the supporting steel balls 12, because the supporting steel balls 12 receive at least part of a dead weight of the movable member 1, followability of the supporting steel balls 12 to the inner wall surface of the bottom surface 11b is maintained at a high level during the relative movement. On the other hand, for the support with respect to the side surfaces 11a by the supporting steel balls 13, when the vibration power generator 10 is horizontally arranged on the XY-plane as illustrated in FIG. 2, a force to press the supporting steel balls 13 against the inner wall surface of the side surface 11a is not theoretically applied. Therefore, the followability of the supporting steel balls 13 to the inner wall surface is not always maintained at a high level during the relative movement. Because the relative movement of the movable member 1 fluctuates when the followability degrades, there is a possibility of increasing the azimuth between the array of the electrodes 6 and 7 and the electret 2 during the relative movement.

Figure 4:
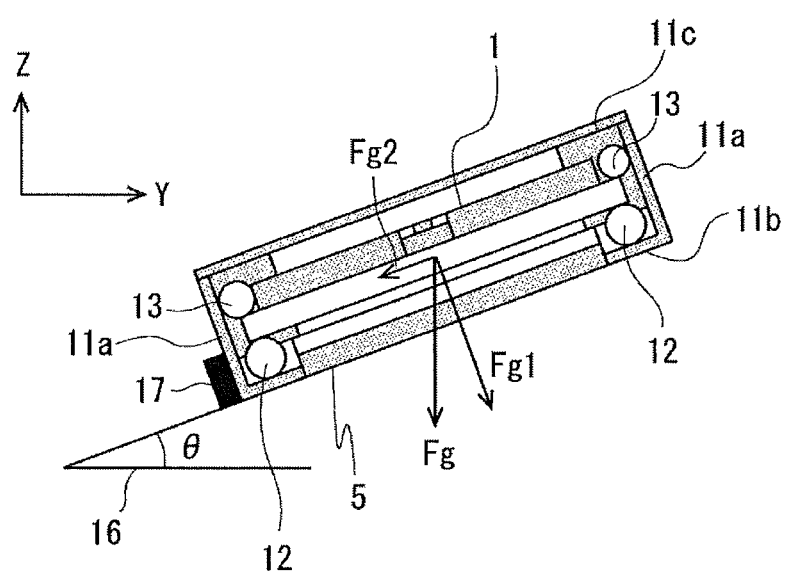
FIG. 4 is a view illustrating a state in which the vibration power generator in FIG. 2 is installed.

Therefore, in the vibration power generator 10 of one or more embodiments of the invention, in the case of the support with respect to the side surface 11a by the supporting steel balls 13, a configuration in FIG. 4 is used in order to apply the force to press the supporting steel balls 13 against the inner wall surface of the side surface 11a. FIG. 4 is a view illustrating the arrangement of the vibration power generator 10 in the ZY-plane. The movable member 1 moves relatively in the direction (X-direction) perpendicular to a paper plane. In the configuration of FIG. 4, the whole vibration power generator 10 is maintained in a tilted state in the ZY-plane. Specifically, the vibration power generator 10 is fixed on a slope of a tilting device 16 with a fixing device 17. The tilting device 16 has the slope having a tilt angle of θ with respect to the Y-direction.

As a result, as illustrated in FIG. 4, the vibration power generator 10 is maintained in the tilted state in the ZY-plane when generating the power. In this case, a dead weight Fg of the movable member 1 is applied to the inner wall surfaces of the bottom surface 11b and side surface 11a through the supporting steel balls 12 and 13 while divided into a component force Fg1 perpendicular to the inner wall surface of the bottom surface 11b and a component force Fg2 perpendicular to the inner wall surface of the side surface 11a. Therefore, during the relative movement of the movable member 1, the followability of the supporting steel balls 13 to the inner wall surface of the side surface 11a is also maintained at a high level while the followability of the supporting steel balls 12 to the inner wall surface of the bottom surface 11b is maintained at the high level. The vibration power generator 10 is installed in the tilted state to bias the movable member 1 toward the inner wall surface of the side surface 11a through the supporting steel balls 13. Accordingly, the installment of the vibration power generator 10 in the tilted state corresponds to the support retainer of one or more embodiments of the invention. Because the relative movement direction of the movable member 1 is uniquely defined by the inner wall surface of the bottom surface 11b and the inner wall surface 11a of the side surface 11, the increase in azimuth can be constrained during the relative movement of the movable member 1, and therefore the degradation of vibration efficiency of the vibration power generator 10 can be avoided.

<Assembly of Vibration Power Generator 10>

A method for assembling the vibration power generator 10 will be described with reference to FIGS. 5A to 5F. The assembly of the vibration power generator 10 of one or more embodiments of the invention is not limited to the following assembly method, but the following assembly method is suitable for forming a structure to constrain the azimuth during the relative movement of the movable member 1. In each of FIGS. 5A to 5F, an upper stage is a plan view (a plan view of the XY-plane), and a lower stage is a sectional view (a sectional view of the ZY-section).

(Process 1)

Figure 5A:
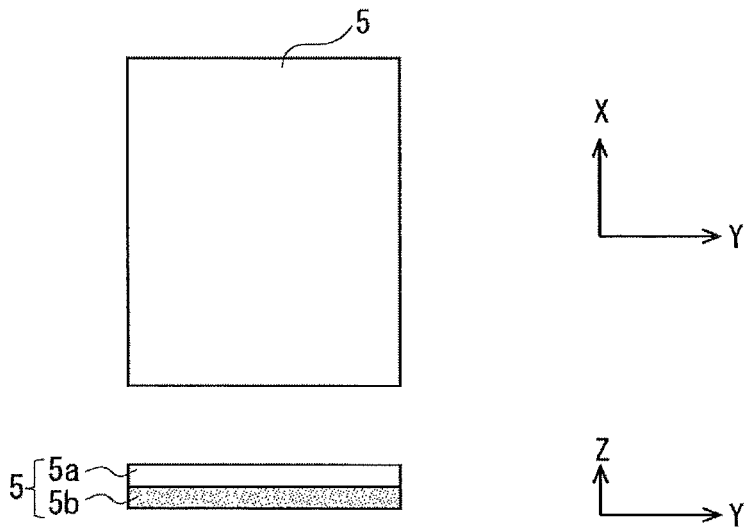
FIG. 5A is a first view illustrating an assembly process of the vibration power generator in FIG. 2.

As illustrated in FIG. 5A, the fixed member 5 is formed by arranging the electrode group 5a on the fixed board 5b. The electrode group 5a can be fixed to the fixed board 5b by a physical method such as bonding with a bonding agent, caulking, and screw fitting. In order to correctly position the electrode group 5a with respect, to the fixed board 5b, a positioning projection may be provided on the side of the fixed board 5b, and the electrode group 5a may be fixed to the fixed board 5b after brought into contact with the positioning projection. Alternatively a jig may be used to fix the electrode group 5a.

(Process 2)

Figure 5B:
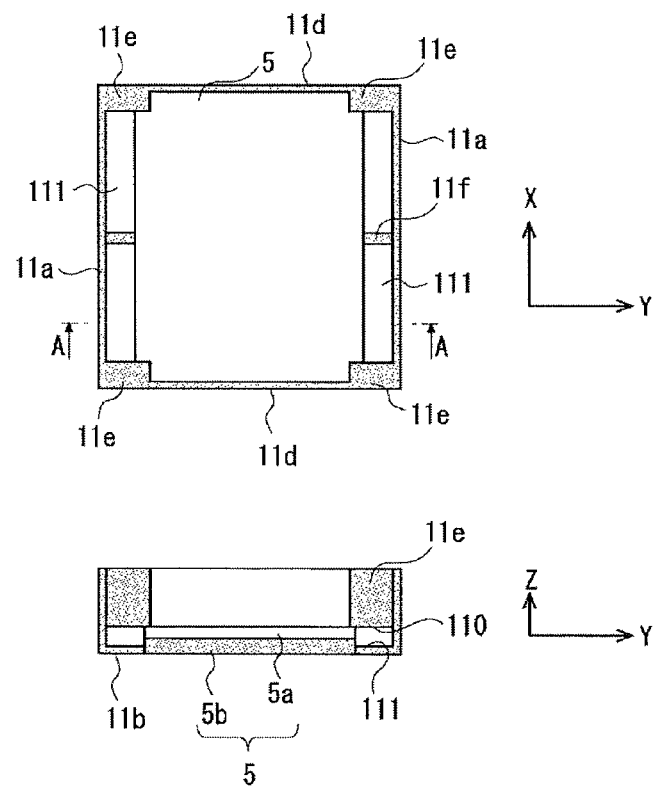
FIG. 5B is a second view illustrating the assembly process of the vibration power generator in FIG. 2.

Then, as illustrated in FIG. 5B, the fixed member 5 produced in the process 1 is inserted from the side of the bottom surface 11b of the casing 11 such that the electrode group 5a faces toward the inside of the casing 11. At this point, projection portions 11e are provided at four corners of the casing 11 in order to fix a level position. For a lower surface 110 of the projection portion 11e, a level dimension is correctly defined with respect to an inner wall surface 111 of the bottom surface 11b of the casing 11. Positioning projection portions 11f are provided in the casing 11 in order to position the fixed member 5 with respect to the casing 11 in a crosswise direction (Y-direction) in FIG. 5B. The fixed member 5, which is inserted into the casing 11 from the side of the bottom surface 11b while positioned in the crosswise direction by the positioning projection portions 11f, is fixed to the bottom surface 11 while abutting on the lower surfaces 110 of the projection portions 11e. The fixed member 5 can be fixed to the bottom surface 11 by a physical method such as bonding with a bonding agent, caulking, and screw fitting.

(Process 3)

Figure 5C:
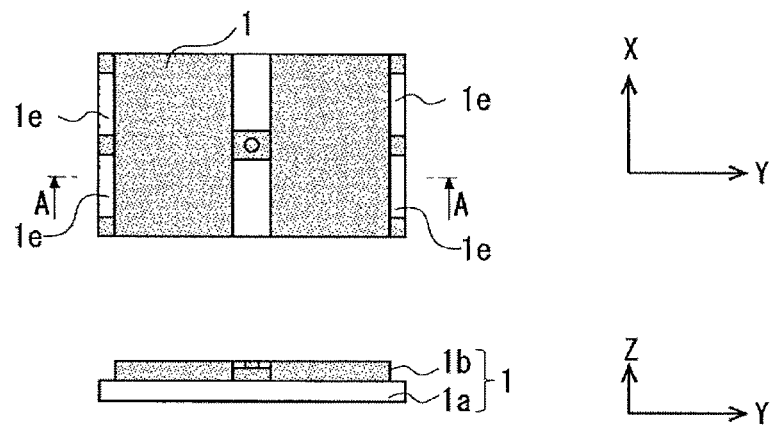
FIG. 5C is a third view illustrating the assembly process of the vibration power generator in FIG. 2.

Then, as illustrated in FIG. 5C, the movable member 1 is formed by arranging the electret group 1a on the movable board 1b. The electret group 1a can be fixed to the movable board 1b by a physical method such as bonding with a bonding agent, caulking, and screw fitting. In order to correctly position the electret group 1a with respect to the movable board 1b, a positioning projection may be provided on the side of the movable board 1b, and the electret group 1a may be fixed to the movable board 1b after brought into contact with the positioning projection. Alternatively a jig may be used to fix the electret group 1a. As described above, in order to arrange the supporting steel balls 13 between the movable board 1b and the inner wall surfaces of the side surfaces 11a, the electret group 1a is fixed to the movable board 1b to form the supporting grooves 1e.

(Process 4)

Figure 5D:
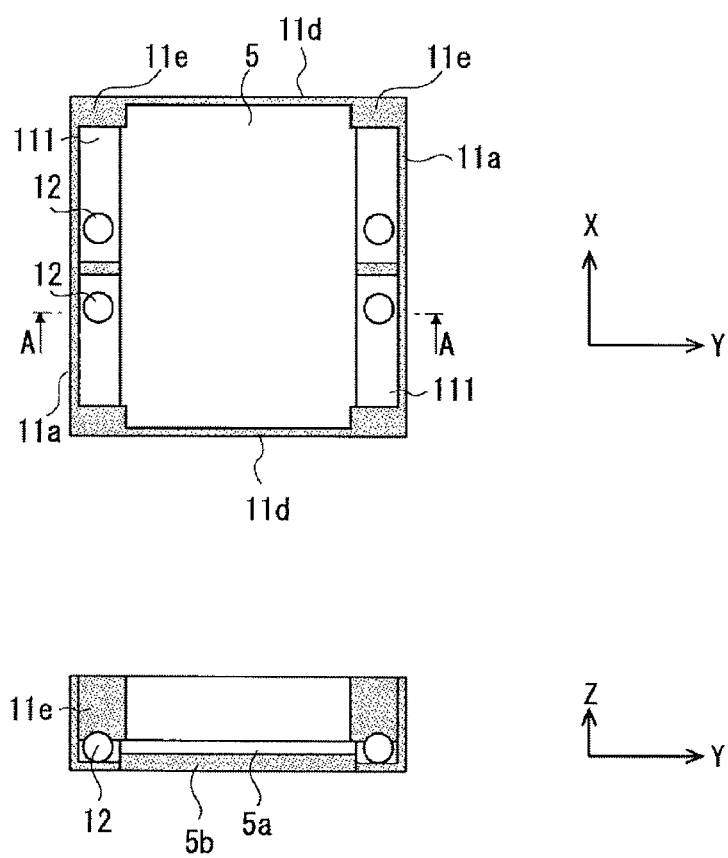
FIG. 5D is a fourth view illustrating the assembly process of the vibration power generator in FIG. 2.

Then, as illustrated in FIG. 5D, in the casing 11 in which the fixed member 5 is fixed in the process 2, the supporting steel balls 12 are arranged on the inner wall surface 111 of the bottom surface 11b. The inner wall surface 111 is located between the side surface of the fixed member 5 and the side surface 11a of the casing 11 by fixing the fixed member 5. FIG. 5D illustrates the state in which the four supporting steel balls 12 are arranged in order to stably support the movable member 1.

(Process 5)

Figure 5E:
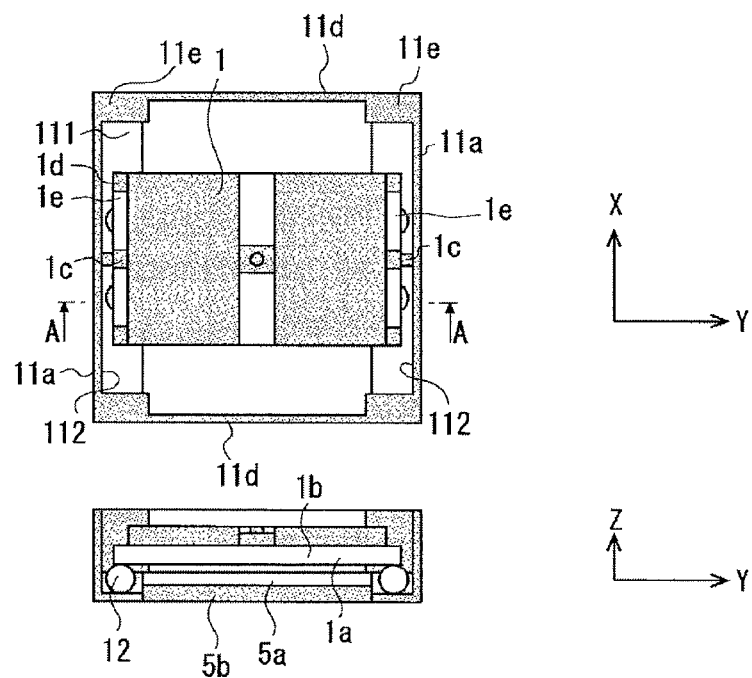
FIG. 5E is a fifth view illustrating the assembly process of the vibration power generator in FIG. 2.

Then, as illustrated in FIG. 5E, the movable member 1 produced in the process 3 is placed on the four supporting steel balls 12 arranged in the process 4. Therefore, a surface of the electret group 1b on the movable member 1 is located upward by a diameter of the supporting steel ball 12 based on the inner wall surface 111 of the bottom surface 11b. On the other hand, a surface of the electrode group 5a on the fixed member 5 is abutted on the lower surfaces 110 of the projection portions 11e in which the level is determined based on the inner wall surface 111, thereby determining the level of the surface of the electrode group 5a. Accordingly, because both the level of the surface of the electret group 1b and the level of the surface of the electrode group 5a of the fixed member 5 are based on the inner wall surface 111, the gap distance between the movable member 1 and the fixed member 5 can correctly be defined only by placing the movable member 1 on the supporting steel balls 12 in the process 5.

(Process 6)

Figure 5F:
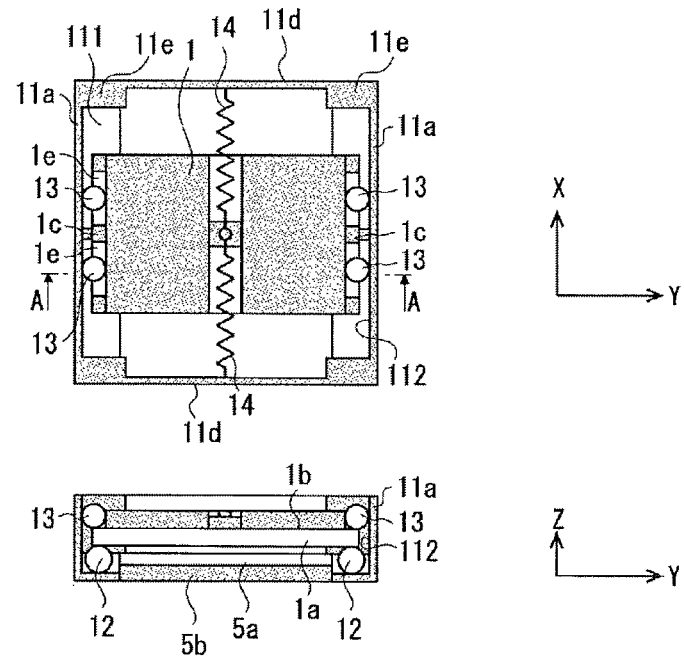
FIG. 5F is a sixth view illustrating the assembly process of the vibration power generator in FIG. 2.

Finally, as illustrated in FIG. 5F, the supporting steel balls 13 are placed on the supporting grooves 1e of the movable member 1 arranged on the supporting steel balls 12 in the process 5, and the movable member 1 and the side surfaces 11d of the casing 11 are coupled to each other by way of a coupler 15 provided in the central portion of the movable member 1, and the movable member 1 and the like are accommodated in the casing 11 by covering the top surface 11c.

The vibration power generator 10 assembled in the above way is installed on the tilting device 16 in FIG. 4 such that the side surface 11a is located downward, which allows the support state by the supporting steel balls 13 to be maintained well. In the assembly method, the supporting steel balls 12 and 13 are arranged using the inner wall surfaces (the inner wall surfaces of the bottom surface 11b and the side surfaces 11a) of the casing 11, so that the assembly can relatively easily be performed.

Second Embodiment

Figure 6:
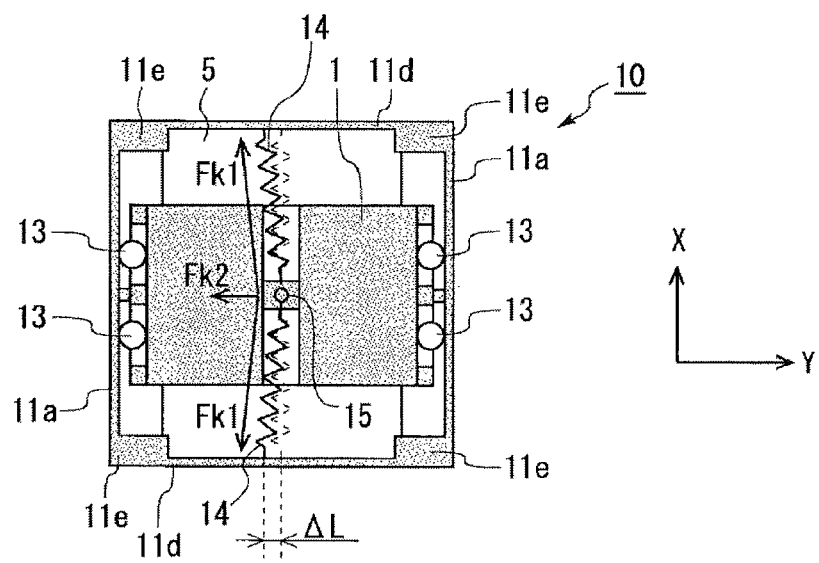
FIG. 6 is a plan view of a vibration power generator according to a second embodiment of the invention.

A second embodiment in FIG. 6 is the configuration in which the force to press the supporting steel balls 13 against the inner wall surface of the side surface 11a is applied in the case of the support with respect to the side surface 11a by the supporting steel balls 13. In the second embodiment, in the two springs 14 coupled to the movable member 1 with the coupler 15, a coupling place of each spring 14 on the side of the casing 11 is shifted toward the side of the side surface 11a to which the pressing force is applied by a distance ΔL with respect to the coupling place of the first embodiment, namely, the central portion of each side surface 11d. As a result, a direction of an elastic force Fk1 applied to the movable member 1 by the springs 14 is oriented toward the side of the side surface 11a compared with the direction of the first embodiment (substantially relative movement direction). A net force Fk2 of the elastic forces from the springs 14 is generated toward the side surface 11a, and the net force Fk2 acts as the force to press the supporting steel balls 13 against the inner wall surface of the side surface 11a. Because the relative movement direction of the movable member 1 is uniquely defined by the inner wall surface of the bottom surface 11b and the inner wall surface 11a of the side surface 11, the increase in azimuth can be constrained during the relative movement of the movable member 1, and therefore the degradation of the vibration efficiency of the vibration power generator 10 can be avoided. Accordingly, the two springs 14 that bias the movable member 1 toward the inner wall surface of the side surface 11a through the supporting steel balls 13 correspond to the support retainer of one or more embodiments of the invention.

In the configuration of FIG. 6, the two springs 14 are coupled to the movable member 1 using the coupler 15 at one place, a turning force is hardly applied to the movable member 1 compared with a case that the springs 14 are coupled using couplers at a plurality of places. When turning movement is generated in the movable member 1 that moves relatively in the relative movement direction, the relative movement for the power generation is disturbed. Therefore, the coupling configuration of the second embodiment is useful for constraining the degradation of power generation efficiency.

Third Embodiment

Figure 7:
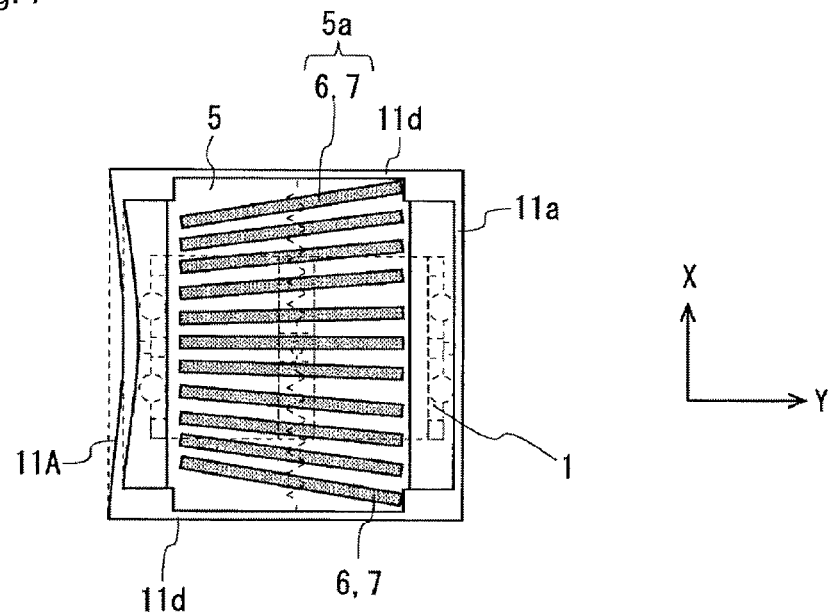
FIG. 7 is a plan view of a vibration power generator according to a third embodiment of the invention.

A third embodiment concerning the array of the electrodes included in the electrode group 5a of the fixed member 5 will be described with reference to FIG. 7. In producing the casing 11, the side surface to be pressed by the supporting steel balls 13 is more easily curved with decreasing thickness of the side surface. FIG. 7 exaggeratingly illustrates a degree of curvature of the side surface, and the curved side surface is designated by a reference numeral 11A in order to distinguish the curved side surface from the side surfaces of the first and second embodiments. Even if the movable member 1 moves relatively while the supporting steel balls 13 are pressed against the curved side surface 11A, although the decrease in azimuth can be expected to some extent, the azimuth caused by the curvature of the side surface 11A is hardly removed.

In view of that, the array of the electrodes 6 and 7 in the electrode group 5a of the fixed member 5 is adjusted according to the curvature of the side surface 11A, which allows the removal of the azimuth caused by the curvature of the side surface 11A. For example, as illustrated in FIG. 7, in the case that the side surface 11A is curved such that the central portion of the side surface 11A swells inward, the electrode group 5a is formed such that the electrodes 6 and 7 are perpendicular to the inner wall surface of the side surface 11A. Accordingly, in the example of FIG. 7, the electrodes are arranged such that the gap between the electrodes on the electrode group 5a is narrowed toward the left side (the side of the side surface 11A) in FIG. 7.

Thus, the supporting steel balls 13 are pressed against the inner wall surface of the side surface 11A while the fixed member 5 is formed in the above way. Even if the side surface 11A is curved, the increase in azimuth can be constrained in the relative movement of the movable member 1, and therefore the degradation of the vibration efficiency of the vibration power generator 10 can be maximally avoided.

Fourth Embodiment

Figure 8:
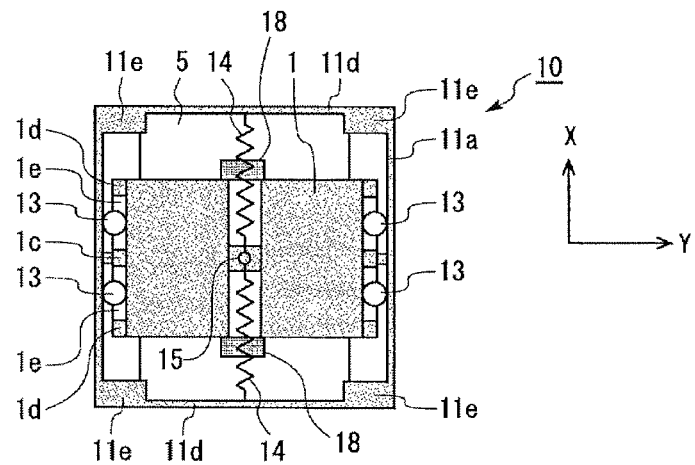
FIG. 8 is a plan view of a vibration power generator according to a fourth embodiment of the invention.

A vibration power generator 10 according to a fourth embodiment of the invention will be described with reference to FIG. 8. In the vibration power generator 10 of FIG. 8, projection portions 18 each of which projects onto the side of the side surface 11d located in the relative movement direction of the movable member 1 are provided in the central portion of the movable member 1 in the Y-direction. In the case that the movable member 1 vibrates largely in response to the external vibration, the projection portion 18 contacts with the inner wall surface of the side surface 11d.

For a large amplitude of the movable member 1, the movable member 1 contacts with a portion of the inner wall surface of the side surface 11d corresponding to the projection portion 18, namely, the substantially central portion of the inner wall surface. As the place where the side surface 11d contacts with the movable member 1 is closer to the central portion, a distance between the place and a turning center of the movable member 1 can be shortened. Therefore, the turning force applied to the movable member 1 can be reduced. As a result, the degradation of the power generation efficiency can be constrained in the vibration power generator 10.

Fifth Embodiment

Figure 9A:
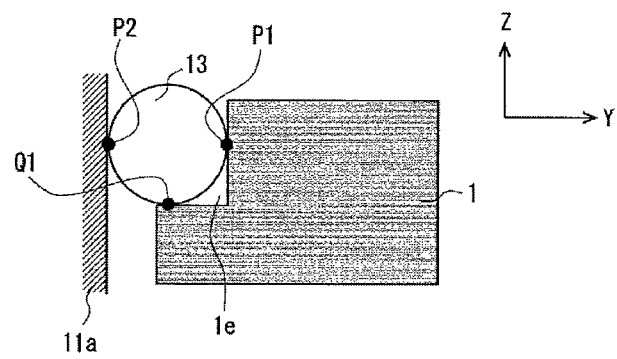
FIG. 9A is a first view illustrating a support structure between a movable member and a lateral inner wall surface of the vibration power generator of one or more embodiments of the invention.
Figure 9B:
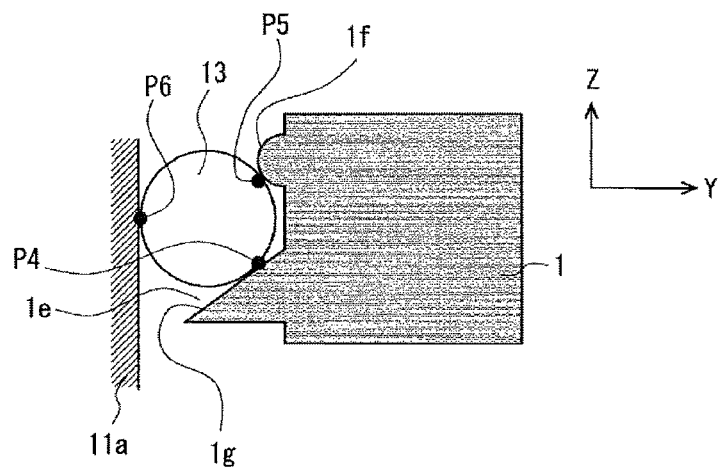
FIG. 9B is a second view illustrating a support structure between the movable member and the lateral inner wall surface of the vibration power generator of one or more embodiments of the invention.
Figure 9C:
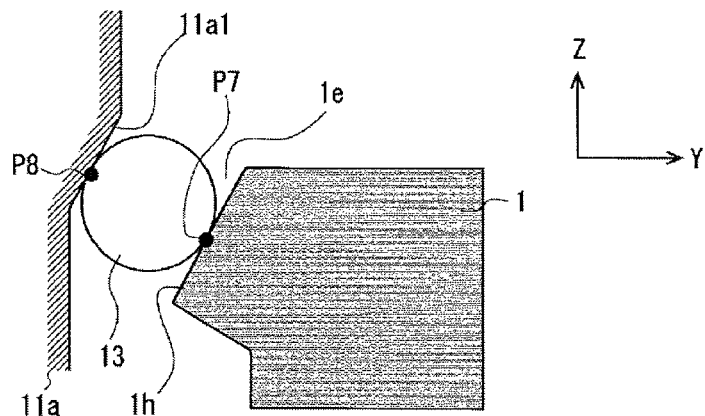
FIG. 9C is a third view illustrating a support structure between the movable member and the lateral inner wall surface of the vibration power generator of one or more embodiments of the invention.

The state in which the movable member 1 is supported by the inner wall surface of the side surface 11a with the supporting steel ball 13 interposed therebetween will be described with reference to FIGS. 9A to 9C. FIGS. 9A to 9C schematically illustrate the support state, and FIG. 9A illustrates the state in which the movable member 1 is supported using the supporting steel ball 13 arranged in the supporting groove 1e like in the first to fourth embodiments. In the support state of FIG. 9A, the supporting steel ball 13 contacts with the inner wall surface of the side surface 11a at a point P2 while contacting with the movable member 1 at points P1 and Q1, and differential sliding is easily generated because the contact points P1 and Q1 differ from each other in a rolling radius of the supporting steel ball 13. For example, because rolling friction is generated at the point P1 while sliding friction is generated at the point P2, there is a risk of degrading wear resistance concerning the support by the supporting steel ball 13 or acceleration performance of the movable member 1.

Therefore, a support structure in FIG. 9B can be used as the state in which the movable member 1 is supported by the inner wall surface of the side surface 11a with the supporting steel ball 13 interposed therebetween. In the support structure in FIG. 9B, the supporting steel ball 13 is supported by a projecting slope 1g (in this state, the supporting steel ball 13 contacts with the slope 1g at a point P4) such that the supporting steel ball 13 does not drop from the supporting groove 1e, and the supporting steel ball 13 contacts with a hemispherical projection portion 1f provided above the slope 1g. In this state, the supporting steel ball 13 contacts with the projection portion 1f at a point P5, and the supporting steel ball 13 contacts with the inner wall surface of the side surface 11a at a point P6. As to a correlation among the points P4, P5, and P6, sizes and shapes of the slope 1g and the projection portion 1f are designed such that an isosceles triangle is formed with the point P6 as a vertex. As a result, the rolling radius of the supporting steel ball 13 can be equalized at the points P4 and P5, and therefore the generation of the differential sliding can be constrained.

A structure in FIG. 9C can also be used as the structure to constrain the generation of the differential sliding in the supporting steel ball 13. In the structure of FIG. 9C, the supporting steel ball 13 is supported by a slope 1h such that the supporting steel ball 13 does not drop from the supporting groove 1e, and the supporting steel ball 13 contacts with the slope 1h at a point P7. A slope 11a1 parallel to the slope 1h is formed on the inner wall surface side of the side surface 11a, and the supporting steel ball 13 contacts the slope 11a1 at a point P8. In the structure of FIG. 9C, the supporting steel ball 13 contacts with the slopes 1h and 11a1 only at the points P7 and P8. As to a relationship between the points P7 and P8, the shapes of the slopes 1h and 11a1 are designed such that a line connecting the points P7 and P8 passes through the center of the supporting steel ball 13. As a result, the generation of the differential sliding can be constrained in the supporting steel ball 13.

Sixth Embodiment

In order to obtain the smooth relative movement between the movable member 1 and the fixed member 5, desirably the supporting steel ball 13 does not contact with both the ends (the central projection 1c and the end-side projection 1d) of the supporting groove 1e. Accordingly, desirably a length (a length in the relative movement direction) of the supporting groove 1e is greater than or equal to a length in which the maximum amplitude of the movable member 1 is added to the diameter of the supporting steel ball 13. The maximum amplitude of the movable member 1 is a maximum value of the amplitude during the relative movement of the movable member 1 by the conceivable external vibration. For example, the maximum amplitude of the movable member 1 is 2 mm in the case that the movable member 1 moves (vibrates) relatively within a range of ±2 mm.

Other Embodiments

In the first to sixth embodiments, the movable member 1 moves relatively, namely, reciprocates with respect to the fixed member 5 in response to the external vibration to generate the power. Additionally, the azimuth constraining structure disclosed in one or more of the embodiments can also be applied to a power generator that generates the power by the relative movement different from that of one or more of the above embodiments. For example, the azimuth constraining structure of one or more of the embodiments can suitably be applied to a device, such as a linear motor, in which a movable member moves in one direction with respect to a fixed member in response to an external force to generate the power, and a device in which a movable member moves permanently in one direction or reciprocates to rotationally move above an inner or outer surface of a circularly-formed fixed member to generate the power.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF SYMBOLS 1 movable member
1a electret group
1b movable board
1e supporting groove
2 electret
5 fixed member
5a electrode group
5b fixed board 6, 7 electrode
10 vibration power generator
11 casing
11a side surface
11b bottom surface
11d side surface
12 supporting steel ball
13 supporting steel ball
14 spring
15 coupler
16 tilting device
18 projection portion

The invention claimed is:

1. A vibration power generator configured to generate power by displacement between an electret group comprising a plurality of electrets and an electrode group comprising a plurality of electrodes in a relative movement direction in response to an external vibration, the vibration power generator comprising:
   a casing in which the electret group and the electrode group are disposed;
   a fixed member in which one of the electret group and the electrode group is disposed, the fixed member being fixed to a side of the casing;
   a movable member in which the other of the electret group and the electrode group is disposed, the movable member being disposed in the casing such that the movable member is relatively movable in response to the external vibration while opposed to the fixed member;
   a first support that relatively movably supports the movable member with respect to a bottom surface of the casing so as to define a gap between the electret group and the electrode group;
   a second support that supports the movable member such that the movable member is relatively movable with respect to a lateral inner wall surface of the casing unit, the lateral inner wall surface of the casing defining the relative movement direction together with the bottom surface of the casing; and
   a support retainer that biases the movable member toward the lateral inner wall surface of the casing to retain a state in which the movable member is supported by the second support during the relative movement.

2. The vibration power generator according to claim 1, further comprising:
   an tilting unit that tilts the casing such that the lateral inner wall surface in which the movable member is supported by the second support is arranged downward relative to a surface in which the vibration power generator is installed,
   wherein the support retainer biases the movable member toward the lateral inner wall surface using a dead weight of the movable member by tilting the casing by way of the tilting unit.

3. The vibration power generator according to claim 2, wherein, based on a shape of the lateral inner wall surface defining the relative movement direction, an array of the plurality of electrets in the electret group and an array of the plurality of electrodes in the electrode group are determined such that an overlapping area of the plurality of electrets comprised in the electret group and the plurality of electrodes comprised in the electrode group is maximized, and
   wherein the plurality of electrets and the plurality of electrodes are related to vibration power generation.

4. The vibration power generator according to claim 2, wherein the movable member comprises a contact unit that contacts with a movement-direction inner wall surface of the casing when the movable member is displaced along the relative movement direction, the movement-direction inner wall surface being located in the relative movement direction of the movable member, and
   wherein the movement-direction inner wall surface being located in a central region of a width of the movable member opposed to the movement-direction inner wall surface.

5. The vibration power generator according to claim 1, further comprising:
   a plurality of elastic members disposed between the movable member and the casing,
   wherein the support retainer biases the movable member toward the lateral inner wall surface by a net force of elastic forces generated by the plurality of elastic members, the net force being applied to the movable member.

6. The vibration power generator according to claim 5, wherein the plurality of elastic members are coupled to the movable member using one coupler located at one place.

7. The vibration power generator according to claim 6, wherein, based on a shape of the lateral inner wall surface defining the relative movement direction, an array of the plurality of electrets in the electret group and an array of the plurality of electrodes in the electrode group are determined such that an overlapping area of the plurality of electrets comprised in the electret group and the plurality of electrodes comprised in the electrode group is maximized, and
   wherein the plurality of electrets and the plurality of electrodes are related to vibration power generation.

8. The vibration power generator according to claim 6, wherein the movable member comprises a contact unit that contacts with a movement-direction inner wall surface of the casing when the movable member is displaced along the relative movement direction, the movement-direction inner wall surface being located in the relative movement direction of the movable member, and
   wherein the movement-direction inner wall surface being located in a central region of a width of the movable member opposed to the movement-direction inner wall surface.

9. The vibration power generator according to claim 5, wherein, based on a shape of the lateral inner wall surface defining the relative movement direction, an array of the plurality of electrets in the electret group and an array of the plurality of electrodes in the electrode group are determined such that an overlapping area of the plurality of electrets comprised in the electret group and the plurality of electrodes comprised in the electrode group is maximized, and
   wherein the plurality of electrets and the plurality of electrodes are related to vibration power generation.

10. The vibration power generator according to claim 5, wherein the movable member comprises a contact unit that contacts with a movement-direction inner wall surface of the casing when the movable member is displaced along the relative movement direction, the movement-direction inner wall surface being located in the relative movement direction of the movable member, and wherein the movement-direction inner wall surface being located in a central region of a width of the movable member opposed to the movement-direction inner wall surface.

11. The vibration power generator according to claim 1, wherein the support retainer biases the movable member toward the lateral inner wall surface by a predetermined physical force, and
wherein the physical force is applied between the movable member and the lateral inner wall surface so as to bring the movable member and the lateral inner wall surface close to each other.

12. The vibration power generator according to claim 11, wherein, based on a shape of the lateral inner wall surface defining the relative movement direction, an array of the plurality of electrets in the electret group and an array of the plurality of electrodes in the electrode group are determined such that an overlapping area of the plurality of electrets comprised in the electret group and the plurality of electrodes comprised in the electrode group is maximized, and
wherein the plurality of electrets and the plurality of electrodes are related to vibration power generation.

13. The vibration power generator according to claim 11, wherein the movable member comprises a contact unit that contacts with a movement-direction inner wall surface of the casing when the movable member is displaced along the relative movement direction, the movement-direction inner wall surface being located in the relative movement direction of the movable member, and
wherein the movement-direction inner wall surface being located in a central region of a width of the movable member opposed to the movement-direction inner wall surface.

14. The vibration power generator according to claim 1, wherein, based on a shape of the lateral inner wall surface defining the relative movement direction, an array of the plurality of electrets in the electret group and an array of the plurality of electrodes in the electrode group are determined such that an overlapping area of the plurality of electrets comprised in the electret group and the plurality of electrodes comprised in the electrode group is maximized, and
wherein the plurality of electrets and the plurality of electrodes are related to vibration power generation.

15. The vibration power generator according to claim 14, wherein the movable member comprises a contact unit that contacts with a movement-direction inner wall surface of the casing when the movable member is displaced along the relative movement direction, the movement-direction inner wall surface being located in the relative movement direction of the movable member, and
wherein the movement-direction inner wall surface being located in a central region of a width of the movable member opposed to the movement-direction inner wall surface.

16. The vibration power generator according to claim 1, wherein the movable member comprises a contact unit that contacts with a movement-direction inner wall surface of the casing when the movable member is displaced along the relative movement direction, the movement-direction inner wall surface being located in the relative movement direction of the movable member, and
wherein the movement-direction inner wall surface being located in a central region of a width of the movable member opposed to the movement-direction inner wall surface.

17. The vibration power generator according to claim 1, wherein the first support performs rolling support of the movable member using a first turning member,
wherein the first turning member is sandwiched between the bottom surface of the casing and the movable member,
wherein the second support performs rolling support of the movable member using a second turning member, and
wherein the second turning member is sandwiched between the lateral inner wall surface and the movable member.

18. The vibration power generator according to claim 17, wherein the second turning member is a steel ball having a spherical shape,
wherein, while the support retainer retains the support state:
the steel ball contacts with the movable member at first and second contact points,
the steel ball is supported in a direction opposite to a dropping direction of the steel ball at the first contact point,
the second contact point is located on a side opposite to the first direction with respect to the steel ball, and
the steel ball contacts with the lateral inner wall surface at a third contact point, and
wherein a virtual triangle formed by connecting the first, second, and third contact points is an isosceles triangle with the third point as a vertex.

19. The vibration power generator according to claim 17, wherein the second turning member is a steel ball having a spherical shape,
wherein, while the support retainer retains the support state:
the steel ball contacts with the movable member at a first contact point,
the steel ball is supported in a direction opposite to a dropping direction of the steel ball at the first contact point, and
the steel ball contacts with the lateral inner wall surface at a second contact point, and
a virtual straight line connecting the first and second contact points passes through a center of the steel ball.

20. A power generator configured to generate power by relative movement between an electret group comprising a plurality of electrets and an electrode group comprising a plurality of electrodes, the power generator comprising:
a casing in which the electret group and the electrode group are disposed;
a fixed member in which one of the electret group and the electrode group is disposed, the fixed member being fixed to a side of the casing;
a movable member in which the other of the electret group and the electrode group is disposed, the movable member being disposed in the casing such that the movable member is relatively movable in response to an external force while opposed to the fixed member;
a first support that relatively movably supports the movable member with respect to a bottom surface of the casing so as to define a void between the electret group and the electrode group;
a second support that supports the movable member such that the movable member is relatively movable with respect to a lateral inner wall surface of the casing, the lateral inner wall surface of the casing defining a direction of the relative movement together with the bottom surface of the casing; and a support retainer that biases the movable member toward the lateral inner wall surface of the casing to retain a state in which the movable member is supported by the second support during the relative movement.

* * * * *